United States Patent [19]

Kosiancic

[11] 4,016,226
[45] Apr. 5, 1977

[54] METHOD OF MAKING POROUS NUCLEAR FUEL
[75] Inventor: Eugene Joseph Kosiancic, Richland, Wash.
[73] Assignee: The Babcock & Wilcox Company, New York, N.Y.
[22] Filed: Feb. 10, 1975
[21] Appl. No.: 548,460
[52] U.S. Cl. .................. 264/.5; 75/222; 176/89
[51] Int. Cl.$^2$ ..................... G21C 21/02
[58] Field of Search ........... 264/.5; 252/301.1 R, 252/301.1 S; 176/89; 75/222

[56] References Cited

UNITED STATES PATENTS

| | | | |
|---|---|---|---|
| 2,792,302 | 5/1957 | Mott | 75/222 |
| 3,114,689 | 12/1963 | Cope | 264/.5 |
| 3,214,270 | 10/1965 | Valyi et al. | 75/222 |
| 3,268,997 | 8/1966 | Miller | 75/222 |
| 3,540,884 | 11/1970 | Hurbury | 75/222 |
| 3,812,050 | 5/1974 | Steele | 264/.5 |
| 3,846,520 | 11/1974 | Bruijn et al. | 264/.5 |
| 3,852,045 | 12/1974 | Wheeler et al. | 75/222 |

Primary Examiner—Benjamin R. Padgett
Assistant Examiner—David Leland
Attorney, Agent, or Firm—J. M. Maguire; J. P. Sinnott

[57] ABSTRACT

Illustrative embodiments of the invention disclose fuel pellets for nuclear reactors in which the pellets have a controlled and relatively homogeneous porosity that accommodates fuel swelling and permits fission gases to escape from these pellets. Typically, small low density spheres, that may be formed from highly volatile material, are blended with a nuclear fuel powder, and are pressed and sintered into pellets of appropriately low density to produce an improved product.

2 Claims, No Drawings

METHOD OF MAKING POROUS NUCLEAR FUEL

BACKGROUND OF THE INVENTION

1. Field of the Invention

This invention relates to methods and apparatus for producing sintered products and, more specifically, to methods and apparatus for producing nuclear fuel pellets of generally uniform porosity, and the like.

2. Description of the Prior Art

A number of techniques have been developed for manufacturing nuclear fuel pellets, but all of these techniques have failed to provide a consistently satisfactory product. In this respect, it is important to understand the unique and essentially hostile environment in which these pellets are used. Basically, individual pellets of uranium dioxide, or other nuclear fuel pellets, are loaded into and sealed in a slender, hollow metal tube. This fuel rod, or "fuel pin", is one of an array of similar rods that establish in accumulation of fissonable material in sufficient concentration to support sustained fission reactions within the core of a nuclear reactor.

These fission reactions generate heat, which can be used to produce useful power; neutrons, which are the nuclear particles that initiate and sustain the fission reactions; and fission products, which usually are radioactive and must be contained within the individual fuel rods for reasons of health and safety. Thus, the fissionable material nuclei, on absorbing a neutron, split more or less in half, the halves thereby forming the nuclei of two entirely different elements, some of which are in the gaseous state under the temperature and pressure conditions within the fuel rod. In these circumstances of high temperature and the formation of elements with different chemical and physical properties within the pellets the need to maintain the integrity of the fuel rod is an extremely difficult task.

Perhaps the most significant source of difficulty in this respect is caused by the structural instability of the fuel pellets. Fuel pellets, for example, under conditions frequently encountered within reactor cores tend to "swell", or to undergo a change in physical dimensions. The cause, or causes, of this swelling is not fully understood, but the phenomenon nevertheless has been observed many times. Clearly, given the usual reactor core environment, even relatively minor changes in pellet dimensions can cause the enclosing metal tube to burst or to collapse and release radioactive fission products.

Radioactive gas generated within the pellets also must be allowed to escape into a void space within the rod structure, to help preserve the physical integrity of the individual pellets.

A number of pellet manufacturing methods have been developed through the years. These techniques reflect different attempts to overcome the effects of fuel pellet swelling. Basically, all of these proposed solutions appear to have been directed to the preparation of a suitably low density fuel pellet, characterized by a controlled and uniformly distributed porosity. Ideally, these low density pellets should accommodate fuel swelling under arduous reactor condition of pressure, temperature and radiation. These pellet preparation techniques, however, are not entirely satisfactory.

In some instances, a volatile additive is combined with the powdered nuclear fuel. On heating to enable the powered fuel so sinter or coalesce into one mass, the volatile matter should evaporate, and, in this manner, produce a strong but porous pellet structure. Unfortunately, this volatilization technique frequently leaves an undesirable residue within the pores, or an unsatisfactorily small void volume.

There are other techniques, for example, which rely on the method of fuel powder granulation, or make use of blended fuel powders in which each of the constituent powders in the blend is heat treated at a different temperature before being mixed together and sintered. In the granulation method the resulting pores are not evenly distributed through the pellet volume but tend to appear as a few undesirably large pores. The heat-treated powder, moreover, imposes difficult production control requirements.

SUMMARY OF THE INVENTION

These and other problems that have characterized the prior art are, to a great extent, overcome through the present invention. Illustratively, small spheres of low density and, perhaps, highly volatile content, are blended with a sinterable grade of nuclear fuel powder. The powder-and-sphere mixture is pressed into pellets which are then sintered. Depending on the physical nature of the spheres in the blend, the spheres shrink in volume through evaporation or gasify completely. This produces a general uniform distribution of pores, each pore of a suitably controlled volume that provides, in the aggregate, a predetermined void fraction for each pellet.

More particularly, in connection with evaporation techniques, a sinterable grade of uranium dioxide ($UO_2$) ceramic powder is mixed with a quantity of $UO_2$ "gel" spheres. These gel spheres are, essentially, small particles of $UO_2$ surrounded by water. A pellet press die is filled with a reasonably uniform mixture of this feed material in the die is pressed to a pressure between 10,000 to 40,000 pounds per square inch (psi). The prepressed or "green" pellet then is removed from the die and sintered at temperatures in the approximate range of 1200° C to 1650° C in order to form strong, low density pellets of nuclear fuel. During sintering, moreover, it has been noted that water from the gel evaporates and the gel spheres undergo a linear shrinkage of about one third of the spherical radius, thereby producing an effective void volume of 70%.

In this respect several further advantages obtain. The sintered gel spheres completely match the heavy element concentrations, no impurities are added to the system and excellent particle size control is acquired, thus leading to greater porosity control.

In a somewhat similar manner with respect to gasification, "Eccospheres", that is, tiny hollow spheres which exhibit densities of about 40% of their theoretical maximum density are mixed with the nuclear fuel powder to obtain a proper over-all powder and "Eccosphere" density characterized by an essentially uniform porosity distribution throughout the mixture. The powder and "Eccosphere" combination is compacted into the usual pellets and fired to sinter the fuel powder and volatilize the "Eccospheres" in order to provide an appropriately strong low density product.

Because "Eccospheres" usually are formed from glass, ceramic or epoxy materials, there is the possible disadvantage of residual contaminants remaining in the fired pellet. Accordingly, it appears that the epoxy "Eccospheres" are best suited for this application because, at elevated temperatures, the epoxy volatilizes into carbon monoxide (CO) and carbon dioxide ($CO_2$) leaving only carbon as a possible containment in the fuel pellets.

It has been found, moreover, that not only is a more uniform porosity established in the fuel pellets but also that the sintered product density can be controlled through an appropriate selection of sphere sizes.

The various features of novelty which characterize the invention are pointed out with particularity in the claims annexed to and forming a part of this specification. For a better understanding of the invention, its operating advantages and specific objects attained by its use, reference should be had to the accompanying descriptive matter in which there is illustrated and described a preferred embodiment of the invention.

DESCRIPTION OF THE PREFERRED EMBODIMENTS

For a more complete appreciation of the invention, a specific example of the practice of the invention is described below.

Grace-Davison $UO_2$ ceramic powder was blended with predetermined quantities of $UO_2$ gel spheres. In this respect, the gel spheres used were of approximately 800 microns diameter in one group of tests and of approximately 30 microns diameter in another group of tests. The pellets were pressed at pressures ranging from 10,000 to 40,000 psi before sintering. The pellets were then sintered and, as a part of the sintering process, about 30% of the gel substance surrounding the $UO_2$ evaporates or dissipates, leaving a porous structure in the sintered pellet. Test data from these pellets are summarized as follows:

Table 1.

| Pellet Number | w/o Spheres | Sphere Size (microns) | Pressing Pressure psi | Green Density (% T. D.) | Sintered Density (% T. D.) |
|---|---|---|---|---|---|
| 4 | 20 | 800 | 10,000 | 41.3 | — |
| 5 | 20 | 800 | 10,000 | 40.0 | — |
| 6 | 20 | 800 | 10,000 | 39.7 | — |
| 7 | 20 | 800 | 10,000 | 38.8 | — |
| 8 | 20 | 800 | 10,000 | 37.6 | — |
| 9 | 20 | 800 | 10,000 | 39.1 | — |
| 10 | 20 | 800 | 10,000 | 40.2 | — |
| 11 | 20 | 800 | 10,000 | 43.5 | — |
| 16 | 20 | 800 | 10,000 | 36.4 | 74.3 |
| 17 | 20 | 800 | 10,000 | 39.8 | 74.5 |
| 18 | 20 | 800 | 20,000 | 42.8 | 83.5 |
| 19 | 20 | 800 | 20,000 | 44.4 | 85.3 |
| 20 | 20 | 30 | 20,000 | 42.0 | 81.7 |
| 21 | 20 | 30 | 20,000 | 41.8 | 80.4 |
| 22 | 20 | 30 | 30,000 | 47.4 | 84.8 |
| 12 | 10 | 800 | 20,000 | 44.3 | 76.5 |
| 13 | 10 | 800 | 20,000 | 44.3 | 85.2 |
| 14 | 10 | 800 | 30,000 | 48.3 | 86.6 |
| 15 | 10 | 800 | 30,000 | 47.2 | 85.2 |
| 3 | 20 | 800 | 40,000 | 47.2 | — |
| 2 | 0 | — | 20,000 | — | — |
| 1 | 0 | — | 20,000 | 47.0 | — |

Where T. D. is theoretical density and W/O is weight percent.

The pellets produced in the foregoing manner showed that low density pellets are produced through this technique and that the quantity and size of gel spheres as well as pressing pressure can be used to vary the pellet density. In this respect gel spheres suitable for use in connection with the invention are described more completely in *Sol-Gel Processes for Ceramic Nuclear Fuels*, International Atomic Energy Agency, Vienna, 1968.

A ground but not polished ceramographic mount of pellet No. 5 at a magnification of 15x showed that the distribution of spheres did not appear to be very homogeneous. This apparent lack of homogeneity, however, was ascribed to a failure to make a special effort to homogenize the spheres in the $UO_2$ powder. The same pellet, polished, and studied at a 100x magnification showed a great deal of grain growth in a high density sphere that was imbedded in the $UO_2$ pellet matrix. This large grain structure is not common to normal sol-gel $UO_2$ spheres. It is believed, however, that this occurred because the sintering temperature for pellet 5 (1650° C) was much higher than normally used for sol-gel processes ($\sim$ 1200° C).

With respect to the use of Eccospheres in place of the gel spheres considered above, it should be noted that these hollow glass, ceramic or epoxy spheres are manufactured by Emerson & Cuming, Inc. of Canton, Massachusetts. These Eccospheres, moreover, are completely hollow and exhibit densities of about 40% of the theoretical density.

The epoxy spheres appear to be best suited to the present invention, because at elevated sintering temperatures, the epoxy should break down to give volatile carbon monoxide and carbon dioxide, leaving only carbon as a possible contaminant in the porous structure. If nitrogen gas is used, moreover, in the sintering process, and a high carbon content is present in the pellet structure, then nitride formation also is possible.

The embodiments of the invention in which an exclusive property or privilege is claimed are defined as follows:

1. The method for producing a sintered ceramic pellet with a controlled porosity comprising the steps of blending ceramic nuclear fuel powder with a predetermined quantity of uranium dioxide gel spheres, pressing said blended ceramic nuclear fuel and gel spheres into a pellet, and sintering said pressed pellet to completely dissipate at least a portion of said gel spheres in order to prevent a residue deposit from forming within the pellet and to produce a selectively controlled porosity within said pellet.

2. A method according to claim 1 wherein said blending step further comprises the step of blending uranium dioxide ceramic nuclear fuel powder with a predetermined quantity of uranium dioxide gel spheres.

* * * * *

UNITED STATES PATENT AND TRADEMARK OFFICE
CERTIFICATE OF CORRECTION

PATENT NO. : 4,016,226
DATED : April 5, 1977
INVENTOR(S) : Eugene Joseph Kosiancic It is certified that error appears in the above-identified patent and that said Letters Patent are hereby corrected as shown below:

Column 2, line 37, after the word "material" insert --. The material --.

Signed and Sealed this

Fourteenth Day of June 1977

[SEAL]

Attest:

RUTH C. MASON
*Attesting Officer*

C. MARSHALL DANN
*Commissioner of Patents and Trademarks*